Figure 1:
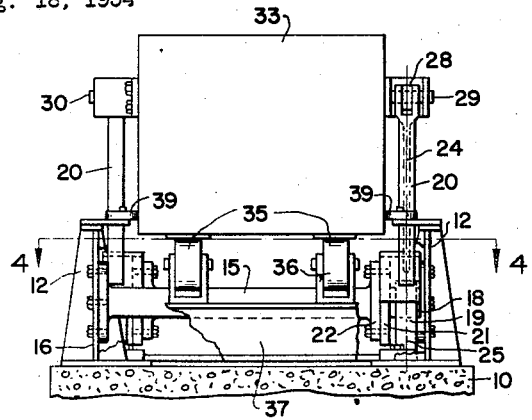

Sept. 2, 1958     T. W. SPAETGENS     2,850,116
VIBRATION NEUTRALIZERS

Filed Aug. 18, 1954     4 Sheets-Sheet 1

INVENTOR
THEODORE W. SPAETGENS
BY
Fetherstonhaugh & Co.
ATTORNEYS

Sept. 2, 1958     T. W. SPAETGENS     2,850,116
VIBRATION NEUTRALIZERS

Filed Aug. 18, 1954     4 Sheets-Sheet 2

INVENTOR
THEODORE W. SPAETGENS
BY
Fetherstonhaugh & Co.
ATTORNEYS

Sept. 2, 1958     T. W. SPAETGENS     2,850,116
VIBRATION NEUTRALIZERS
Filed Aug. 18, 1954     4 Sheets-Sheet 3
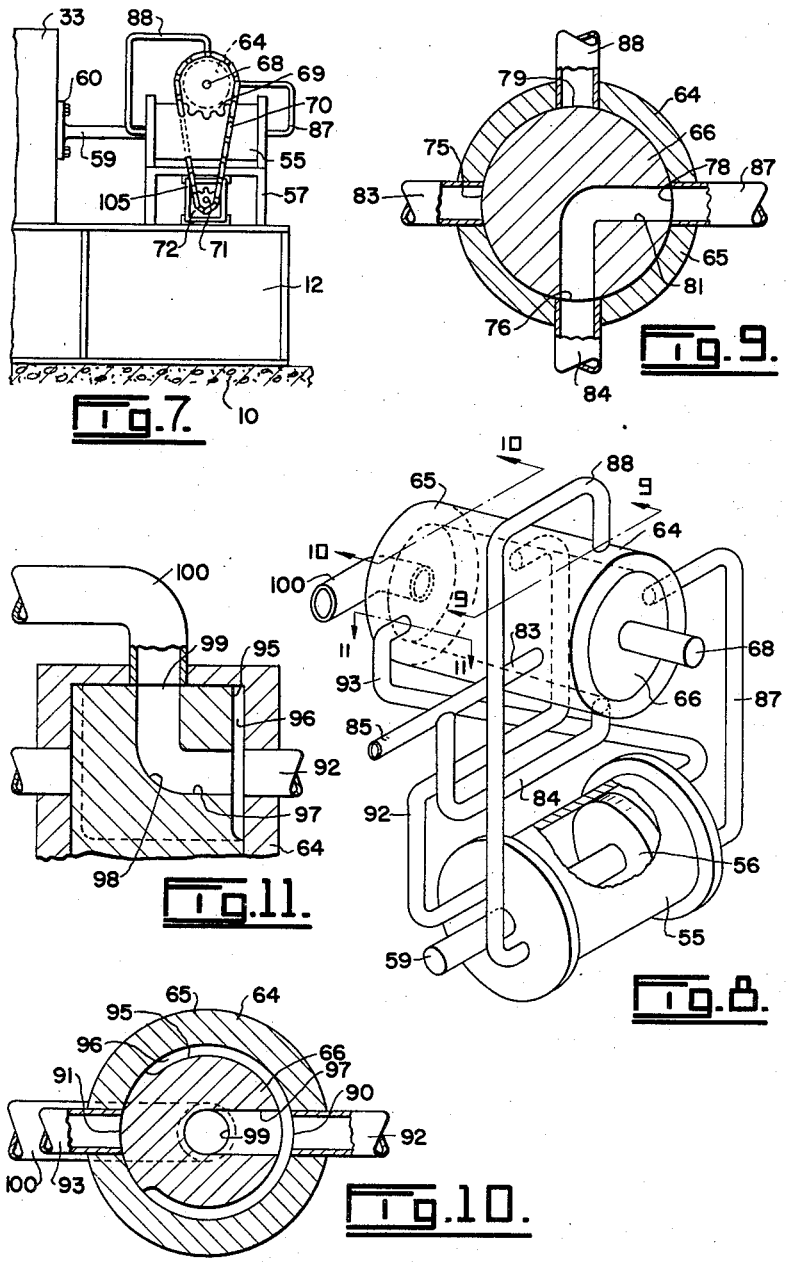
INVENTOR
THEODORE W. SPAETGENS
BY
Fetherstonhaugh & Co.
ATTORNEYS Sept. 2, 1958 T. W. SPAETGENS 2,850,116
VIBRATION NEUTRALIZERS
Filed Aug. 18, 1954 4 Sheets-Sheet 4
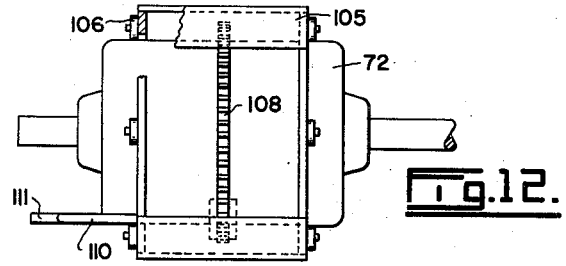
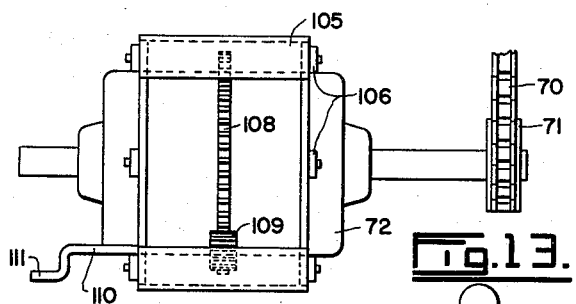
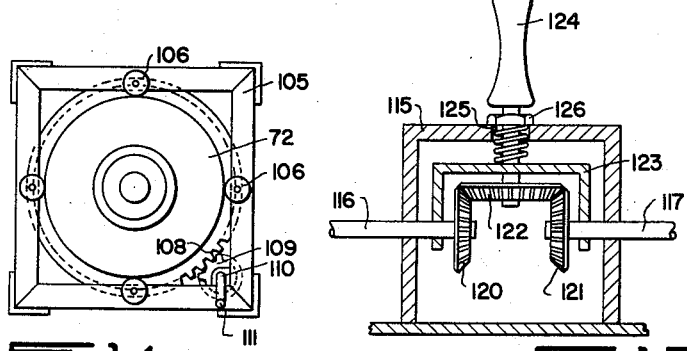
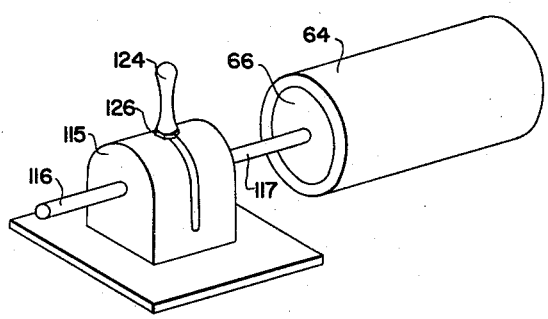
INVENTOR
THEODORE W. SPAETGENS
BY
Fetherstonhaugh & Co.
ATTORNEYS United States Patent Office 2,850,116
Patented Sept. 2, 1958

2,850,116

VIBRATION NEUTRALIZERS

Theodore W. Spaetgens, South Burnaby, British Columbia, Canada

Application August 18, 1954, Serial No. 450,753

21 Claims. (Cl. 188—1)

This invention relates to devices which may be used for neutralizing or off-setting vibrations created by structures or machines, or for generating vibratory disturbances for investigating or testing purposes.

The invention relates to devices known as "vibration absorbers," "vibration neutralizers," and "resonant-force generators." These terms are more or less interchangeable, and the term "vibration neutralizer" as used herein is intended to include all these terms.

The things usually needing vibration neutralizers are foundations on which machines operate, machines, boat hulls, and the like. The term "structure" as used herein is intended to include any of these, and the invention has been described herein in connection with a foundation structure as an example.

A vibration neutralizer is essentially a weight or mass connected by a spring element to a structure which needs to be neutralized. The weight of the mass and the stiffness of its spring mounting are such that the natural frequency of vibration thereof is equal, or nearly equal, to the frequency of the vibration which is occurring in the structure. As a result of this resonance, or near-resonance, of the suspended mass, the vibratory motion of the structure causes the mass to vibrate with relatively large vibratory amplitude so that counter forces are applied to the structure. The proper phase relationship between the counter forces applied by the neutralizer and the exciting forces causing the vibration can be obtained by the tuning of the neutralizer mass, that is, by making its frequency slightly higher, equal to, or slightly lower than the frequency of the disturbance, as each case may require. When an auxiliary exciting or energizing device is used to increase the motion of the neutralizer, this phase relationship may be obtained by the exciter itself without requiring the close tuning of the neutralizer mass, especially when the vibratory motion of the structure and therefore its influence upon the neutralizer mass, is small.

The "resonant-force generator," basically similar to the vibration neutralizer and having an exciter or energizer, is a device which functions for the purpose of generating a vibratory force in some prescribed direction. This force may be used to make vibration studies of structure, including ships, etc.; it may be used to neutralize vibration as with the vibration absorber and vibration neutralizer, or it may be used to actuate some type of machine. The degree of tuning in this type of device is generally not as important as in the vibration neutralizer.

The difficulty with vibration neutralizers known prior to this invention was that they would not function satisfactorily when the vibratory force to be neutralized was very large and/or where the disturbing frequency was very low, and particularly when the vibrations were in a horizontal plane. When the force is large and/or the frequency low, the problem of helical or leaf spring design is very difficult. This is because springs capable of transmitting very large forces, and yet flexible enough to give a very low natural frequency to a suspended mass of reasonable proportions, are of necessity excessively large in order to keep the working stresses within the spring material to tolerable limits.

The present invention overcomes these difficulties by using one or more torsion bars to suspend a neutralizing mass. The bar or bars form a resilient connection between the vibrating structure and the neutralizing mass. The torsion bars are more readily adaptable to the space generally available for the spring element in devices of this nature. In addition to this, they make possible the practical construction of either vertical, horizontal or inclined neutralizers, and they function satisfactorily when the vibratory force is very large and/or the disturbing frequency very low.

An auxiliary exciting or energizing device may be used to increase or amplify the motion of the neutralizer mass. The present invention contemplates the use of a device for exciting the motion of the mass in both directions by fluid means, and means of controlling the phase-relationship between the vibratory disturbing force and the neutralizer force through the exciter itself without requiring the close tuning of the neutralizer mass, especially when the vibratory motion of the structure and, therefore, its influence upon the neutralizer mass is small. This control of phase may take place while the device is in operation.

A vibration neutralizer according to the present invention includes a torsion bar which is fixedly connected at one end to a suitable support, and suitable connecting means at the opposite end of the bar for connecting it to the structure to be neutralized while still allowing the bar end to rotate. This connecting means may be a bearing connected to the structure and in which the bar end is journalled. Suitable linkage or other connecting means is provided at the rotatably mounted end of the shaft for connecting said end to a neutralizing inertia mass. This mass is guided for reciprocal movement in one plane only, this usually being either a vertical or horizontal plane, although it may be inclined, depending upon the direction of the vibrations to be neutralized.

An exciter or energizer has been provided for vibration neutralizers which excites in both directions of movement of the excited mass. This includes an operating cylinder having a piston connected to the mass in order to reciprocate therewith. Means are provided for alternately directing fluid to and exhausting fluid from both ends of the cylinder. A rotary valve is included for controlling the flow of fluid to and from the cylinder ends. If the vibrations to be neutralized are caused by a machine driven by a synchronous motor at a constant speed, the valve may be driven by a synchronous motor which is so mounted on its base that it can be revolved around the axis of its armature to alter the phase, even while in operation, of the excitation with regard to the disturbing force or motion. Alternatively, the rotary valve may be operated by a drive from the machine causing the disturbance, utilizing in the drive a device for changing the phase while in operation.

Figure 2:
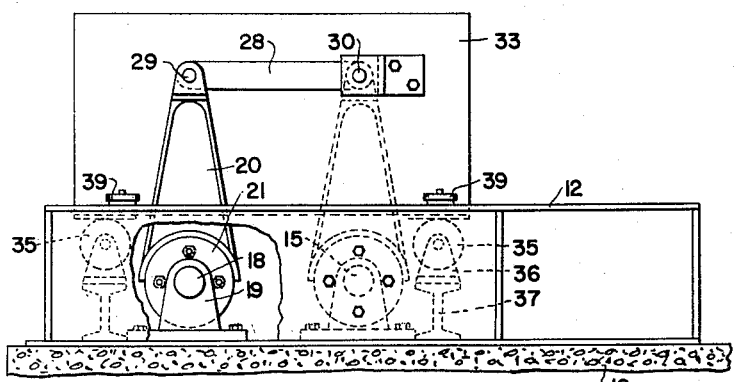
Figure 3:
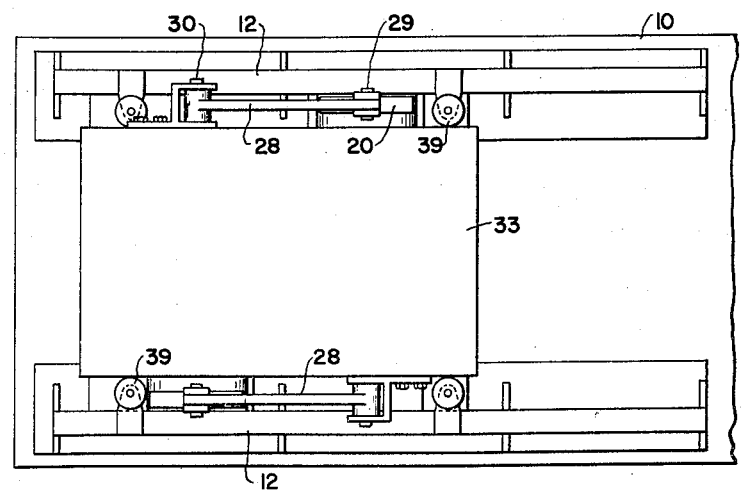
Figure 4:
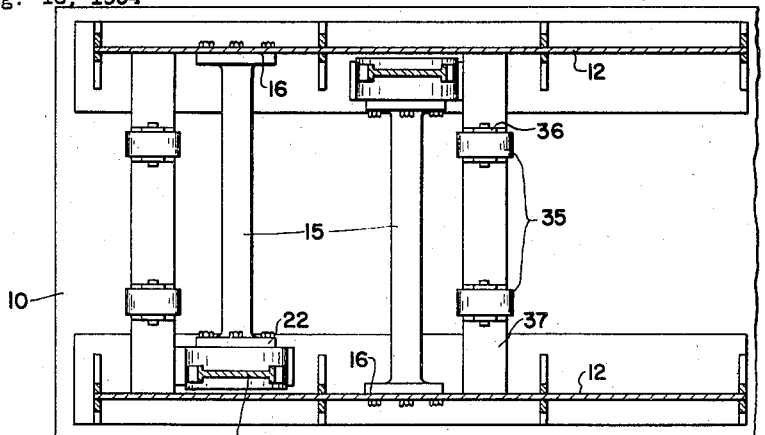
Figure 5:
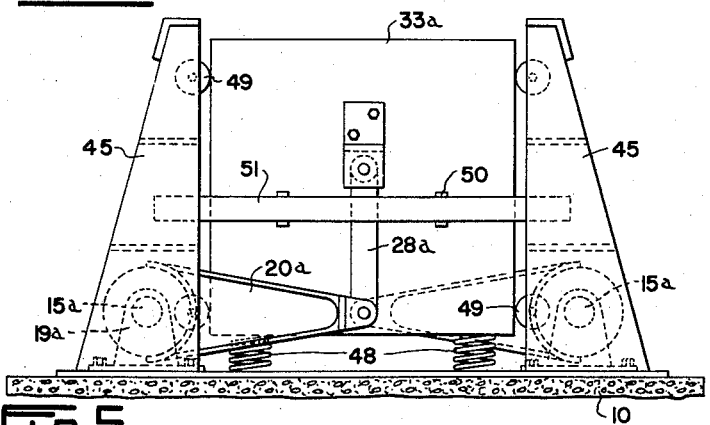
Figure 6:
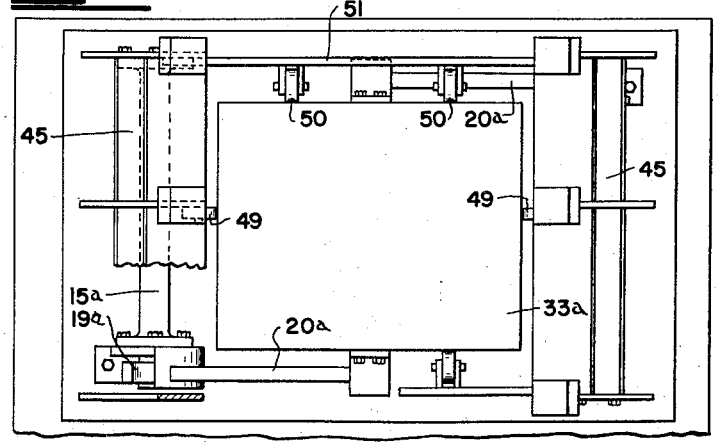

Examples of this invention are illustrated in the accompanying drawings, in which, Figure 1 is an end elevation of a linear vibration neutralizer, Figure 2 is a side elevation of this neutralizer, Figure 3 is a plan view thereof, Figure 4 is a horizontal section taken on the line 4—4 of Figure 1, Figure 5 is an end elevation of a vertical vibration neutralizer, Figure 6 is a plan view of the neutralizer of Figure 5, Figure 7 is a side elevation of an exciter or neutralizer with one form of control, Figure 8 is a diagram illustrating a cylinder of the exciter and a rotary control valve therefor, Figure 9 is an enlarged cross section through the control valve on line 9—9 of Figure 8, Figure 10 is an enlarged cross section through the control valve on line 10—10 of Figure 8, Figure 11 is an enlarged horizontal section taken on the line 11—11 of Figure 8, Figure 12 is an enlarged plan view of the motor for the exciter of Figure 7, showing the mounting thereof, Figure 13 is an enlarged side elevation of this exciter motor, Figure 14 is an enlarged end elevation of the exciter motor, Figure 15 is a perspective view of an alternative form of exciter control, and Figure 16 is an enlarged longitudinal section through the exciter control of Figure 15.

Referring to Figures 1 to 4, 10 is a foundation upon which a machine, not shown, is mounted, said machine being the source of the vibrations to be neutralized. As stated above, this invention contemplates the use of one or more torsion bars. It is, however, usual to use at least two of these bars in order to keep the neutralizer properly balanced.

The neutralizer includes a base frame including two spaced side members 12. A torsion bar 15 is fixedly connected at one end 16 to each side member 12, there being two bars alternately arranged and spaced from each other. As these bars in this example are identical and the parts associated therewith are the same, only one will now be described in detail.

The opposite or free end of the torsion bar 15 is in the form of a stub shaft 18 projecting outwardly therefrom which is journalled in a substantial bearing 19 mounted upon and projecting upwardly from the structure 10 just inside the base member 12 spaced from the other base member to which this torsion bar is connected. A lever 20 is provided at one end with a projection 21 which is fixedly connected to a shoulder 22 formed on or connected to the torsion bar near the free end thereof. The stub shaft 18, which is really an extension of the torsion bar, extends through the projection 21. Alternatively, the stub shaft 18 may be formed with or connected to the lever projection 21, but it would still be in effect an extension of the torsion bar. The actual bar would terminate at its point of connection with the lever projection. In this example, the lever 20 extends upwardly from the bar. By referring to Figure 1, it will be seen that the vertical centre line or line of force 24 of the lever is in the same plane as the transverse centre line 25 of the bearing. This is preferred since it prevents or reduces any bending stress in the bar due to the alternating loads and reactions on the lever and bearing respectively.

A link 28 is pivotally connected at one end by pin 29 to the outer or free end of the lever, and is pivotally connected at its opposite end by pin 30 to the side of a weight mass or block 33. Link 28 preferably extends outwardly from the lever substantially at right angles thereto and in line therewith so that its line of force is in the same plane as that of the lever. The mass or block 33 may rest on a plurality of rollers 35 rotatably mounted in supports 36 carried either by a cross member 37 extending between the side members 12 and forming part of the base of the neutralizer, or by a separate structure, if desired. The rollers and the block are so arranged that the latter can reciprocate in a horizontal direction, and the path of reciprocation extends at right angles to the axis of the torsion bar 15. If desired, additional rollers 39 may be provided at opposite sides of the mass or block to constrain it against lateral movement while permitting longitudinal movement thereof.

The mass or block may be formed in any desired manner. For example, it may be a solid block of metal or concrete, or it may be in the form of a container filled with water, sand, lead or any other desired material.

By referring to Figures 3 and 4, it will be seen that there is a torsion bar 15 beneath each end of the mass or block 33 and extending transversely thereof. There is a link 28 connected to each side of this block and extending to a lever 20 which is fixed to and projects upwardly from the end of a torsion bar.

Horizontal reciprocation of the neutralizer mass 33, excited in this example by movement of the foundation 10, introduces a bearing reaction (bearing 19) equal to the inertia load on the link 28. In addition to this, a torque is applied through the torsion bar to the side member 12 to which it is attached, but this torque has no net effect in terms of a balancing force. When resonance or near-resonance exists, large amplitudes of the inertia mass can be realized with correspondingly large bearing reactions or neutralizing forces. The length of the lever arm, torsional flexibility of the torsion bar, amount of the neutralizer mass, are quantities which must be selected, in proper relationship to each other, for each application or situation.

It has been found that these torsion bars make it possible to neutralize vibratory forces which are very large and/or where the disturbing frequency is very low without taking up much space. It will readily be seen that the bars may be placed above or below the neutralizing mass, thus taking up little space.

Figures 5 and 6 disclose a form of the invention very similar to that of Figures 1 to 4, the main difference being that the mass or block 33a is mounted for vertical reciprocation. It is obvious that this block could also be mounted to reciprocate in an inclined direction. The base frame consists of spaced side members 45 fixedly mounted on the structure 10 and extending upwardly as high or higher than the block. Alternately arranged torsion bars 15a extend parallel with the block and are each fixedly connected at one end to a base member 45. The opposite or free ends of these bars are journalled in bearings 19a which are also fixedly mounted on the structure 10. In this case, the levers 20a extend outwardly in a horizontal direction from their respective torsion bars. Said levers extend transversely of and overlap opposite ends of the block 33a. Links 28a connect the free ends of the levers to the adjacent block ends. The block or mass may be suspended completely by the torsion bars and the elements connecting them to the block, or, if desired, helical springs 48 may be provided upon which the block may rest, said springs taking at least part of the load of the block. In fact, helical springs such as these may be provided at opposite ends of the block of Figures 1 to 4 to assist the torsion bars. Guide rollers 49 may be provided on the two base members 45 to bear against the adjacent sides of the block to constrain it against lateral movement while permitting it to move in a vertical direction. Similar rollers 50 may bear against the other sides of the block to prevent transverse movement thereof. These rollers may be carried by bars 51 extending between the base members 45.

The neutralizer of Figures 5 and 6 operates in the same manner as that previously described. It does, however, neutralize vertical vibrations where the former neutralizer offsets horizontal vibrations.

Figures 7 to 14 illustrate an exciter or energizer which may be used with this or any other neutralizer. This exciter includes a cylinder 55 having a piston 56 operating therein. The axis of this cylinder extends in the same direction as the path of movement of the neutralizer mass. In this example, the cylinder is arranged horizontally and is mounted by a bracket 57 on one end of the base of the neutralizer. A rod 59 connected at one end to piston 56, slidably extends through an end of the cylinder, and is connected to an end of the mass or block 33 at 60. Thus, the piston and block move together.

A rotary control valve 64 is provided for the cylinder.

This valve consists of a cylindrical casing 65 having a tapered rotor 66 rotatably fitting therein. A shaft 68 projects outwardly from one end of the rotor and is rotated in any desired manner. In this example, a sprocket 69 fixedly mounted on the shaft is connected by a chain 70 to another sprocket 71 fixedly mounted on the drive shaft of a synchronous motor 72 which is also mounted on the base frame of the exciter. This drive arrangement for the rotor may be used when the machine causing the vibrations is driven by a synchronous motor at a constant speed.

The valve casing 65 is formed with inlet ports 75 and 76 arranged substantially 90° from each other, and outlet ports 78 and 79 also arranged substantially at right angles to each other and to the inlet ports. An angular passage 81 is provided in the rotor 66. Supply pipes 83 and 84 extend from ports 75 and 76 to a common supply pipe 85, the latter extending to a fluid source, not shown. The fluid used in this system is usually air, but it may be a liquid or steam if desired. Pipes 87 and 88 extend from the ports 78 and 79 to opposite ends of cylinder 55, see Figure 8.

The inlet and outlet ports of the rotary valve are located near one end thereof, while exhaust ports 90 and 91 are formed in the casing 65 adjacent its opposite end opposed to each other. Pipes 92 and 93 extend from the ports 90 and 91 to opposite ends of the cylinder 55. The adjacent end of the rotor 66 is formed with a reduced portion 95, see Figures 10 and 11, extending the greater part of the distance around the periphery thereof to form a channel 96 between said reduced portion and the casing 65. A passage 97 extends from this channel inwardly towards the centre of the rotor and then bends as at 98 and opens outwardly from the end of the rotor. An exhaust port 99 is formed in the adjacent end of the casing 65 in line with the end of passage 97. An exhaust pipe 100 extends from the latter port. This pipe may extend back to the fluid source.

The various ports of the rotary valve are arranged so that when one end of cylinder 55 is connected through the valve to the supply pipe, the opposite end of the cylinder is connected through the valve to the exhaust pipe, and vice versa. As long as either pipe 92 or 93 is in registry with channel 96, it is connected to the exhaust pipe 100. Each of the pipes 92 and 93 is cut off from the exhaust pipe when the portion of the rotor between the ends of the channel covers the ports 90 and 91 respectively.

Motor 72 rotates the valve at a predetermined speed relative to that of the machine causing the disturbance. If it is desired to bring the unbalanced force and the neutralizer counter force into proper phase while the apparatus is in operation, this may be done by rotating the valve rotor relative to the unbalanced machine forces. This is accomplished by swinging the motor around the axis of its armature.

Figures 12 to 14 show one way of accomplishing this. The motor 72 is supported in a frame 105 by rollers 106 carried by said frame. These rollers are so arranged that the motor can be rotated around the longitudinal axis of its armature. A gear ring 108 is connected to and extends around the motor and meshes with a pinion 109 mounted on a shaft 110 which may be turned by means of a crank 111. Rotation of this crank moves the field of the motor and, consequently, its armature, thus turning sprocket 71 and the rotor 66 to alter the timing of the opening and closing of the various ports of the control valve. This changes the phase relationship of the exciting and counter forces.

Figures 15 and 16 illustrate a phase adjuster through which the rotor 66 of the control valve 64 may be rotated when driven by the unbalanced machine during operation. This adjuster includes a casing 115 having opposed shafts 116 and 117 projecting outwardly therefrom. Shaft 116 is connected for rotation with the unbalanced machine, not shown, while shaft 117 is connected indirectly or directly to the rotor 66 to cause the latter to rotate at the same speed as the shaft. Pinions 120 and 121 are mounted on the shafts 116 and 117 within casing 115 and are rotatably connected through a gear 122 which is carried by a spider 133 rotatably mounted on both shafts. A handle 124 is connected to and extends outwardly from this spider through a slot 125 formed in the casing. A lock nut 126 may be threaded on the handle for releasably retaining it in any adjusted position. The diameter of gear 122 is such as to produce relative motion of 360° between gears 120 and 121 for a 180° swing of handle 124.

When the handle 124 is moved through its slot, shaft 116 is rotated relative to shaft 117 to alter the timing of the opening and closing of the ports of the control valve, thus changing the phase relationship of the exciting and counter forces.

What I claim as my invention is:

1. In a vibration neutralizer, a weight mass mounted to reciprocate in one plane only, a torsion bar, means connected to one end of the bar for preventing movement of said end, means connecting the opposite end of the bar to the mass so that reciprocation of the latter tends to rotate said bar around the longitudinal axis thereof, and means for connecting said opposite end of the bar to a structure to be neutralized without interfering with the rotational action of the bar.

2. In a vibration neutralizer, a weight mass mounted to reciprocate in one plane only, a torsion bar, means connected to one end of the bar for preventing movement of said end, a bearing adapted to be connected to a structure to be neutralized and in which the opposite end of the bar is journalled, and means connecting said opposite end of the bar to the mass so that reciprocation of the latter tends to rotate said bar around the longitudinal axis thereof and induces a bearing reaction equal to the inertia load of the same.

3. A vibration neutralizer as claimed in claim 2 in which the mass is mounted to reciprocate in a horizontal plane only.

4. A vibration neutralizer as claimed in claim 2 in which the mass is mounted to reciprocate in a plane other than a horizontal plane.

5. In a vibration neutralizer, a weight mass mounted to reciprocate in one plane only, a torsion bar, means connected to one end of the bar for preventing movement of said end, a bearing adapted to be connected to a structure to be neutralized and in which the opposite end of the bar is journalled, a linkage means connecting the opposite end of the bar to the mass so that reciprocation of the latter tends to rotate said bar around the longitudinal axis thereof and induces a bearing reaction equal to the inertia load of the mass, the line of force of the linkage from the mass to the bar being in the same plane as the transverse centre line of the bearing.

6. In a vibration neutralizer, a weight mass mounted to reciprocate in one plane only, a torsion bar extending transversely of the mass spaced therefrom, means at one end of the bar for preventing movement of said end, means connecting the opposite end of the bar to the mass so that reciprocation of the latter tends to rotate said bar around the longitudinal axis thereof, said connecting means extending outwardly from the bar substantially at right angles to said axis, and means for connecting said opposite end of the bar to a structure to be neutralized without interfering with the rotational action of the bar.

7. In a vibration neutralizer, a weight mass mounted to reciprocate in one plane only, a torsion bar extending transversely of the mass spaced therefrom, means at one end of the bar for preventing movement of said end, a bearing adapted to be connected to a structure to be neutralized and in which the opposite end of the bar is journalled, and means connecting said opposite end of the bar to the mass so that reciprocation of the latter tends to rotate said bar around the longitudinal axis thereof and induces a bearing reaction equal to the inertia load of the mass, said connecting means extending outwardly from the bar substantially at right angles to said axis.

8. In a vibration neutralizer, a weight mass mounted to reciprocate in one plane only, a torsion bar extending transversely of the mass spaced therefrom, means at one end of the bar for preventing movement of said end, a bearing adapted to be connected to a structure to be neutralized and in which the opposite end of the bar is journalled, and linkage means extending outwardly substantially at right angles to said opposite end of the bar and connecting the latter to the mass so that reciprocation of said mass tends to rotate the bar around the longitudinal axis thereof and induces a bearing reaction equal to the inertia load of the mass, the line of force of the linkage from the mass to the bar being in the same plane as the transverse centre line of the bearing.

9. In a vibration neutralizer, a weight mass mounted to reciprocate in one plane only, a torsion bar extending transversely of the mass spaced therefrom, means at one end of the bar for preventing movement of said end, a bearing adapted to be connected to a structure to be neutralized and in which the opposite end of the bar is journalled, an arm connected to said opposite end of the bar and extending outwardly therefrom in a vertical direction and substantially at right angles to the axis thereof alongside the mass, and a link pivotally connected at one end to the outer end of the lever and at its opposite end to the side of the mass, whereby reciprocation of the mass tends to rotate the bar around the longitudinal axis thereof and induces a bearing reaction equal to the inertia load of the mass.

10. A vibration neutralizer as claimed in claim 9 in which the link is in line with the lever and extends outwardly therefrom at right angles thereto.

11. In a vibration neutralizer, a weight mass mounted to reciprocate in one plane only, a torsion bar extending parallel with the mass to one side thereof, means at one end of the bar for preventing movement of said end, means connecting the opposite end of the bar to the mass so that reciprocation of the latter tends to rotate said bar around the longitudinal axis thereof, said connecting means extending outwardly from the bar substantially at right angles to said axis, and means for connecting said opposite end of the bar to a structure to be be neutralized without interfering with the rotational action of the bar.

12. In a vibration neutralizer, a weight mass mounted to reciprocate in one plane only, a torsion bar extending parallel with the mass to one side thereof, means at one end of the bar for preventing movement of said end, a bearing adapted to be connected to a structure to be neutralized and in which the opposite end of the bar is journalled, and means connecting said opposite end of the bar to the mass so that reciprocation of the latter tends to rotate said bar around the longitudinal axis thereof and induces a bearing reaction equal to the inertia load of the mass, said connecting means extending outwardly from the bar substantially at right angles to said axis.

13. In a vibration neutralizer, a weight mass mounted to reciprocate in one plane only, a torsion bar extending transversely of the mass spaced therefrom, means at one end of the bar for preventing movement of said end, a bearing adapted to be connected to a structure to be neutralized and in which the opposite end of the bar is journalled, and linkage means extending outwardly substantially at right angles to said opposite end of the bar and connecting the latter to the mass so that reciprocation of said mass tends to rotate the bar around the longitudinal axis thereof and induces a bearing reaction equal to the inertia load of the mass, the line of force of the linkage from the mass to the bar being in the same plane as the transverse centre line of the bearing.

14. In a vibration neutralizer, a weight mass mounted to reciprocate in one plane only, a torsion bar extending transversely of the mass to one side thereof, means at one end of the bar for preventing movement of said end, a bearing adapted to be connected to a structure to be neutralized and in which the opposite end of the bar is journalled, an arm connected to said opposite end of the bar and extending outwardly therefrom in a horizontal direction and substantially at right angles to the axis thereof and overlapping an end of the mass, and a link pivotally connected at one end to the outer end of the lever and at its opposite end to the end of the mass, whereby reciprocation of the mass tends to rotate the bar around the longitudinal axis thereof and induces a bearing reaction equal to the inertia load of the mass.

15. A vibration neutralizer as claimed in claim 14 in which the link is in the same plane as the lever and extends outwardly therefrom at right angles thereto.

16. In a vibration neutralizer, a weight mass mounted to reciprocate in one plane only, resilient means connecting the mass to a vibrating structure to be neutralized, said mass being such that it vibrates to apply counter forces to the structure, a cylinder having its longitudinal axis extending in the same direction as the path of movement of the mass, a piston in the cylinder, means connecting the piston to the mass for movement therewith, a control valve having a rotor in a casing and connected to a source of pressure fluid supply and an exhaust, means connecting the valve to both ends of the cylinder, rotation of said rotor alternately connecting opposite ends of the cylinder simultaneously to the fluid source and the exhaust, means for rotating the valve rotor at a predetermined speed in relation to the vibration frequency of the structure, the rotation of the valve rotor being timed to amplify the movements of the mass, and means for turning the rotor relative to its casing during rotation of the former to alter the timing of the valve to change the phase relationship between the disturbing force of the structure and the counter force of the mass.

17. In a vibration neutralizer, a weight mass mounted to reciprocate in one plane only, resilient means connecting the mass to a vibrating structure to be neutralized, said mass being such that it vibrates to apply counter forces to the structure, a cylinder having its longitudinal axis extending in the same direction as the path of movement of the mass, a piston in the cylinder, means connecting the piston to the mass for movement therewith, a control valve having a rotor in a casing and connected to a source of pressure fluid supply and exhaust, means connecting the valve to both ends of the cylinder, rotation of said rotor alternately connecting opposite ends of the cylinder simultaneously to the fluid source and the exhaust, an electric motor having an armature, and means connecting the armature to the valve rotor to rotate the latter at a predetermined speed in relation to the vibration of the structure, the rotation of the valve rotor being timed to amplify the movements of the mass, and said motor being mounted for rotation around the axis of its armature whereby to turn the rotor relative to its casing during rotation of the former to alter the timing of the valve to change the phase relationship between the disturbing force of the structure and the counter force of the mass.

18. In a vibration neutralizer, a weight mass mounted to reciprocate in one plane only, a torsion bar, means connected to one end of the bar for preventing movement of said end, means connecting the opposite end of the bar to the mass so that reciprocation of the latter tends to rotate said bar around the longitudinal axis thereof, means for connecting said opposite end of the bar to a structure to be neutralized without interfering with the rotational action of the bar, and means connected to the mass for amplifying the movement of the latter in both directions during reciprocation thereof.

19. A vibration neutralizer as claimed in claim 18 including means for controlling the amplifying means to adjust the phase relationship between the disturbing force of the structure and the counter force of the mass.

20. In a vibration neutralizer, a weight mass mounted to reciprocate in one plane only, a torsion bar, means connected to one end of the bar for preventing movement of said end, means connecting the opposite end of the bar to the mass so that reciprocation of the latter tends to rotate said bar around the longitudinal axis thereof, means for connecting said opposite end of the bar to a structure to be neutralized without interfering with the rotational action of the bar, a cylinder having its longitudinal axis extending in the same direction as the path of movement of the mass, a piston in the cylinder, means connecting the piston to the mass for movement therewith, a control valve having a rotor in a casing and connected to a source of pressure fluid supply and an exhaust, means connecting the valve to both ends of the cylinder, rotation of said rotor alternately connecting opposite ends of the cylinder simultaneously to the fluid source and the exhaust, and means for rotating the valve rotor at a predetermined speed in relation to the vibration frequency of the structure, the rotation of the valve rotor being timed to amplify the movements of the mass.

21. In a vibration neutralizer, a weight mass mounted to reciprocate in one plane only, resilient means connecting the mass to a vibrating structure to be neutralized, said mass being such that it vibrates to apply counter forces to the structure, a cylinder having its longitudinal axis extending in the same direction as the path of movement of the mass, a piston in the cylinder, means connecting the piston to the mass for movement therewith, a control valve having a rotor in a casing and connected to a source of pressure fluid supply and an exhaust, means connecting the valve to both ends of the cylinder, rotation of said rotor alternately connecting opposite ends of the cylinder simultaneously to the fluid source and the exhaust, a shaft connected to the rotor for rotating the latter, a second shaft aligned with the first shaft, pinions on the adjacent ends of the shafts, a spider rotatably mounted on said shaft ends, means for swinging the spider around the aligned shafts, a gear carried by the spider and meshing with both pinions, and means for rotating the second shaft at a predetermined speed in relation to the vibration frequency of the structure, said rotation of the second shaft rotating the first shaft through the gear and pinions to rotate the valve rotor, this rotating being timed to amplify the movements of the mass and rotation of the spider causing one shaft to rotate relative to the other.

References Cited in the file of this patent
UNITED STATES PATENTS

| | | |
|---|---|---|
| 1,973,510 | Schieferstein | Sept. 11, 1934 |
| 2,226,571 | McGoldrick | Dec. 31, 1940 |
| 2,402,300 | Shimer | June 18, 1946 |